United States Patent
Patton et al.

(10) Patent No.: US 10,996,491 B2
(45) Date of Patent: May 4, 2021

(54) INK COMPOSITION FOR COSMETIC CONTACT LENSES

(71) Applicant: Johnson & Johnson Vision Care, Inc., Jacksonville, FL (US)

(72) Inventors: Jaqunda Patton, Jacksonville, FL (US); Yong Zhang, Jacksonville, FL (US); Alexander Guzman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 164 days.

(21) Appl. No.: 16/271,955

(22) Filed: Feb. 11, 2019

(65) Prior Publication Data

US 2019/0293960 A1 Sep. 26, 2019

Related U.S. Application Data

(60) Provisional application No. 62/646,966, filed on Mar. 23, 2018.

(51) Int. Cl.
| | |
|---|---|
| *G02B 1/04* | (2006.01) |
| *G02C 7/04* | (2006.01) |
| *C09D 183/10* | (2006.01) |
| *C09D 7/63* | (2018.01) |
| *C09D 11/10* | (2014.01) |
| *C09D 133/14* | (2006.01) |
| *C09D 139/06* | (2006.01) |
| *C09D 11/037* | (2014.01) |
| *B29D 11/00* | (2006.01) |
| *C09D 11/107* | (2014.01) |
| *G02C 7/02* | (2006.01) |

(52) U.S. Cl.
CPC .......... *G02C 7/04* (2013.01); *B29D 11/00048* (2013.01); *B29D 11/00134* (2013.01); *C09D 7/63* (2018.01); *C09D 11/037* (2013.01); *C09D 11/10* (2013.01); *C09D 133/14* (2013.01); *C09D 139/06* (2013.01); *C09D 183/10* (2013.01); *G02B 1/043* (2013.01); *C09D 11/107* (2013.01); *G02C 7/021* (2013.01)

(58) Field of Classification Search
CPC .................................................... G02B 1/043
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,113,224 A | 9/1978 | Clark et al. | |
| 4,120,570 A | 10/1978 | Gaylord | |
| 4,136,250 A | 1/1979 | Mueller et al. | |
| 4,153,641 A | 5/1979 | Deichert et al. | |
| 4,197,266 A | 4/1980 | Clark et al. | |
| 4,414,372 A | 11/1983 | Farnham et al. | |
| 4,417,034 A | 11/1983 | Webster | |
| 4,436,887 A | 3/1984 | Chromecek et al. | |
| 4,495,313 A | 1/1985 | Larsen | |
| 4,508,880 A | 4/1985 | Webster | |
| 4,524,196 A | 6/1985 | Farnham et al. | |
| 4,581,428 A | 4/1986 | Farnham et al. | |
| 4,659,782 A | 4/1987 | Spinelli | |
| 4,659,783 A | 4/1987 | Spinelli | |
| 4,740,533 A | 4/1988 | Su et al. | |
| 4,771,116 A | 9/1988 | Citron | |
| 4,889,664 A | 12/1989 | Kindt-Larsen et al. | |
| 4,910,277 A | 3/1990 | Bambury et al. | |
| 4,981,903 A | 1/1991 | Garbe et al. | |
| 5,006,622 A | 4/1991 | Kunzier et al. | |
| 5,034,461 A | 7/1991 | Lai et al. | |
| 5,039,459 A | 8/1991 | Kindt-Larsen et al. | |
| 5,057,578 A | 10/1991 | Spinelli | |
| 5,070,215 A | 12/1991 | Bambury et al. | |
| 5,164,452 A | 11/1992 | Tone et al. | |
| 5,236,969 A | 8/1993 | Kunzler et al. | |
| 5,244,981 A | 9/1993 | Seidner et al. | |
| 5,270,418 A | 12/1993 | Kunzler et al. | |
| 5,298,533 A | 3/1994 | Nandu et al. | |
| 5,314,960 A | 5/1994 | Spinelli et al. | |
| 5,321,108 A | 6/1994 | Kunzler et al. | |
| 5,331,067 A | 7/1994 | Seidner et al. | |
| 5,371,147 A | 12/1994 | Spinelli et al. | |
| 5,387,662 A | 2/1995 | Kunzler et al. | |

(Continued)

FOREIGN PATENT DOCUMENTS

| | | |
|---|---|---|
| EP | 0080539 B1 | 6/1983 |
| EP | 0344692 A2 | 12/1989 |

(Continued)

OTHER PUBLICATIONS

PCT International Search Report, dated Jul. 8, 2019, for PCT Int'l Appln. No. PCT/IB2019/052187.
PCT International Preliminary Report on Patentability, dated Apr. 9, 2019, for PCT Int'l Appln. No. PCT/US2017/051456.
Bas et al, Synthesis, Characterization and properties of amphiphilic block copolymers of 2-hydroxyethyl methacrylate and polydimethylsiloxane prepared by atom transfer radical polymerization, Polymer Journal, 2012, vol. 44, pp. 1087-1097.
Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.

(Continued)

*Primary Examiner* — Michael F Pepitone
(74) *Attorney, Agent, or Firm* — Raef M. Shaltout

(57) ABSTRACT

Provided are ink compositions for making cosmetic contact lenses, as well as cosmetic contact lenses and methods for their preparation and use. The ink composition comprises: (a) a colorant; (b) a hydrophilic polymer; and (c) a binder polymer comprising a triblock polymer of formula: [A]-[B]-[C], wherein [A], [B] and [C] are as described herein.

66 Claims, No Drawings

(56) References Cited

U.S. PATENT DOCUMENTS

| | | |
|---|---|---|
| 5,539,016 A | 7/1996 | Kunzler et al. |
| 5,733,971 A * | 3/1998 | Feldmann-Krane ... C08G 77/46 |
| | | 106/287.1 |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,944,853 A | 8/1999 | Molock et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,087,415 A | 7/2000 | Vanderlaan et al. |
| 6,284,161 B1 | 9/2001 | Thakrar et al. |
| 6,367,929 B1 | 4/2002 | Maiden et al. |
| 6,414,049 B1 | 7/2002 | Alli et al. |
| 6,420,453 B1 | 7/2002 | Bowers et al. |
| 6,423,761 B1 | 7/2002 | Bowers et al. |
| 6,551,531 B1 | 4/2003 | Ford et al. |
| 6,767,979 B1 | 7/2004 | Muir et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 7,052,131 B2 | 5/2006 | McCabe et al. |
| 7,247,692 B2 | 7/2007 | Laredo |
| 7,249,848 B2 | 7/2007 | Laredo et al. |
| 7,276,569 B2 | 10/2007 | Yamago et al. |
| 7,291,690 B2 | 11/2007 | Yamago et al. |
| 7,396,890 B2 | 7/2008 | Zanini et al. |
| 7,461,937 B2 | 12/2008 | STeffen et al. |
| 7,468,398 B2 | 12/2008 | Nicolson et al. |
| 7,473,735 B2 | 1/2009 | Uchiumi et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,615,601 B2 | 11/2009 | Yamago et al. |
| 7,662,899 B2 | 2/2010 | Yamago et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,825,170 B2 | 11/2010 | Steffen et al. |
| 7,879,444 B2 | 2/2011 | Jiang et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,138,290 B2 | 3/2012 | Blackwell et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,415,405 B2 | 4/2013 | Maggio et al. |
| 8,420,711 B2 | 4/2013 | Awasthi et al. |
| 8,450,387 B2 | 5/2013 | McCabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,524,800 B2 | 9/2013 | Phelan |
| 8,545,983 B2 | 10/2013 | Jiang et al. |
| 8,568,626 B2 | 10/2013 | Nicolson et al. |
| 8,637,621 B2 | 1/2014 | Iwata et al. |
| 8,662,663 B2 | 3/2014 | Matsushita et al. |
| 8,686,099 B2 | 4/2014 | Guyer et al. |
| 8,703,891 B2 | 4/2014 | Broad |
| 8,772,367 B2 | 7/2014 | Saxena et al. |
| 8,772,422 B2 | 7/2014 | Saxena et al. |
| 8,835,583 B2 | 9/2014 | Saxena et al. |
| 8,835,671 B2 | 9/2014 | Jiang et al. |
| 8,870,372 B2 | 10/2014 | Li et al. |
| 8,937,110 B2 | 1/2015 | Alli et al. |
| 8,937,111 B2 | 1/2015 | Alli et al. |
| 8,940,812 B2 | 1/2015 | Reboul et al. |
| 8,974,775 B2 | 3/2015 | Saxena et al. |
| 8,980,972 B2 | 3/2015 | Driver |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,200,119 B2 | 12/2015 | Phukan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,255,199 B2 | 2/2016 | Guyer et al. |
| 9,260,544 B2 | 2/2016 | Rathore et al. |
| 9,296,764 B2 | 3/2016 | Bhat et al. |
| 9,297,928 B2 | 3/2016 | Molock et al. |
| 9,297,929 B2 | 3/2016 | Scales et al. |
| 10,676,575 B2 * | 6/2020 | Zhang ................ C08G 81/024 |
| 2001/0049400 A1 | 12/2001 | Alli et al. |
| 2002/0016383 A1 | 2/2002 | Iwata et al. |
| 2002/0099112 A1 | 7/2002 | Turner et al. |
| 2002/0107324 A1 | 8/2002 | Vanderlaan et al. |
| 2002/0133889 A1 | 9/2002 | Molock et al. |
| 2002/0151619 A1 * | 10/2002 | Lin .................... C09D 11/30 |
| | | 523/160 |
| 2003/0052424 A1 | 3/2003 | Turner et al. |
| 2004/0130676 A1 | 7/2004 | Doshi et al. |
| 2004/0209973 A1 | 10/2004 | Steffen et al. |
| 2005/0218536 A1 * | 10/2005 | Quinn .................. G02B 1/043 |
| | | 264/1.7 |
| 2006/0007391 A1 | 1/2006 | McCabe et al. |
| 2008/0102122 A1 | 5/2008 | Mahadevan et al. |
| 2010/0048847 A1 | 2/2010 | Broad |
| 2010/0099829 A1 | 4/2010 | Parakka |
| 2012/0083573 A1 | 4/2012 | Parakka et al. |
| 2013/0155370 A1 | 6/2013 | Zhang |
| 2013/0168617 A1 | 7/2013 | Alli et al. |
| 2013/0172440 A1 | 7/2013 | Alli et al. |
| 2013/0217620 A1 | 8/2013 | Alli et al. |
| 2014/0024791 A1 | 1/2014 | Alli et al. |
| 2014/0031447 A1 | 1/2014 | Alli et al. |
| 2015/0094395 A1 | 4/2015 | Alli et al. |
| 2016/0315347 A1 * | 10/2016 | Li ...................... H01M 10/052 |
| 2017/0183520 A1 * | 6/2017 | Breitkopf ............. G02C 7/049 |
| 2018/0100039 A1 | 4/2018 | Zhang et al. |

FOREIGN PATENT DOCUMENTS

| | | |
|---|---|---|
| EP | 1735643 B1 | 12/2006 |
| EP | 1541592 B1 | 5/2007 |
| EP | 1541550 B1 | 10/2008 |
| EP | 1595894 B1 | 10/2011 |
| EP | 1619211 B1 | 10/2012 |
| KR | 100910403 B1 | 8/2009 |
| RU | 2334770 C1 | 9/2008 |
| WO | 96/31792 A1 | 10/1996 |
| WO | 2003/022321 A2 | 3/2003 |
| WO | 2008061992 A2 | 5/2008 |
| WO | 2008112874 A1 | 9/2008 |
| WO | 2011034801 A1 | 3/2011 |
| WO | 2013177523 A2 | 11/2013 |
| WO | 2014123959 A1 | 8/2014 |

OTHER PUBLICATIONS

Crivello, et al, Photoinitiators for Free Radical Cationic & Anionic Photopolymerisation, 2nd Edition. vol. III, pp. 275-298, John Wley and Sons, New York, 1998.

Goto et al, Mechanism-Based Invention of High-Speed Living Radical Polymerization Using Organotellurium Compounds and Azo-Initiators, Journal of the American Chemical Society, (2003), vol. 125, pp. 8720-8721.

Hawker et al, New polymer synthesis by nitroxide mediated living radical polymerizations, Chem. Rev. 2001, vol. 101, No. 12, pp. 3661-3688.

(56) References Cited

OTHER PUBLICATIONS

Hou et al., Synthesis and Surface Analysis of Siloxane-Containing Amphiphilic Graft Copolymers, Poly(2-hydroxyethyl methacrylate-g-dimethylsiloxane) and Poly(2,3-dihydroxypropyl methacrylate-g-dimethyisiloxane), Macromolecules (2002), vol. 35, pp. 5953-5962.

ISO 18369-4:2006: Ophthalmic optics—Contact lenses—Part 4: Physicochemical properties of contact lens materials.

ISO 9913-1: 1996: Optics and optical instruments—Contact Lenses—Part 1: Determination of oxygen permeability and transmissibility by the FATT method.

Kamigaito et al, Metal-catalyzed living radical polymerization, Chem. Rev. 2001, vol. 101, No. 12, pp. 3689-3745.

Matyjaszewski et al, Atom transfer radical polymerization, Chem. Rev. 2001, vol. 101; No. 9, pp. 2921-2990.

Mi et al., pH responsive properties of non-fouling mixed-charge polymer brushes based on quaternary amine and carboxylic acid monomers, Biomaterials (2010), vol. 31, pp. 2919-2925.

Moad et al, Toward living radical polymerization, Accounts of Chemical Research, vol. 41, No. 9, Sep. 2008, pp. 1133-1142.

Nakamura et al., Organotellurium-mediated living radical polymerization under photoirradiation by a low-intensity light-emitting diode, Beilstein Journal of Organic Chemistry, (2013), vol. 9, pp. 1607-1612.

Nakamura et al., Photoinduced Switching from Living Radical Polymerization to a Radical Coupling Reaction Mediated by Organotelluriurn Compounds, Journal of the American Chemical Society, (2012), vol. 134, pp. 5536-5539.

Ouchi et al, Transition metal-catalyzed living radical polymerization: toward perfection in catalysis and precision polymer synthesis, Chem. Rev. 2009, vol. 109, No. 11, pp. 4963-5050.

PCT International Search Report, dated Nov. 30, 2017, for PCT Int'l Appln. No. PCT/US2017/051456.

Pouget et al, Well-architectured poly(dimethylsiloxane)—containing copolymers obtained by radical chemistry, Chemical Reviews, 2010, vol. 110, No. 3, pp. 1233-1277.

Shinoda et al, Structural Control of Poly(methyl methacrylate)-g-poly(dimethylsiloxane) Copolymers Using Controlled Radical Polymerization: Effect of the Molecular Structure on Morphology and Mechanical Properties, Macromolecules 2003, vol. 36, No. 13, pp. 4772-4778.

Sogah et al, Group Transfer Polymerization. Polymerization of Acrylic Monomers; Macromolecules, Jul. 1987, 1473-1488, 20(7).

Webster et al, Group-Transfer Polymerization, 1. A New Concept for Addition Polymerization with Organosilicon Initiators, Journal of the American Chemical Society, Aug. 24, 1983, 5706-5708, 105(17).

Webster, Group Transfer Polymerization: Mechanism and Comparison with Other Methods for Controlled Polymerization of Acrylic Monomers, Advanced Polymer Science, (2004) 167:1-34.

Yamago et al., Synthesis of structurally well-controlled x-vinylidene functionalized poly (alkyl methacrylate)s and polymethacrylonitrile by organotellurium, organostibine, and organobismuthine-mediated living radical polymerizations, Reactive & Functional Polymers (2009), vol. 69, pp. 416-423.

Yamago et al., Tailored Synthesis of Structurally Defined Polymers by Organotellurium-Mediated Living Radical Polymerization (TERP): Synthesis of Poly(meth)acrylate Derivatives and Their Di- and Triblock Copolymers, Journal of the American Chemical Society, (2002), vol. 124, pp. 13666-13667.

Yamago, Development of Organotellurium-Mediated and Organostibine-Mediated Living Radical Polymerization Reactions, Journal of Polymer Science: Part A: Polymer Chemistry, vol. 44, pp. 1-12 (2006).

Yamago, Precision polymer synthesis by degenerative transfer controlled/living radical polymerization using organotellurium, organostibine, and organobismuthine chain-transfer agents, Chemical Reviews, 2009, vol. 109, No. 11, pp. 5051-5068.

PCT International Search Report; dated Sep. 18, 2020, for PCT Int'l Appln. No. PCT/IB2020/057842.

PCT International Preliminary Report on Patentability, dated Sep. 29, 2020, for PCT Int'l Appln. No. PCT/US2019/052187.

Sutyagin et al., Chemistry and physics of polymers, Tomsk: TPU Publishing House, 2003, p. 142, (translated).

* cited by examiner

INK COMPOSITION FOR COSMETIC CONTACT LENSES

RELATED APPLICATIONS

This application claims priority to U.S. Provisional Patent Application Ser. No. 62/646,966, filed Mar. 23, 2018, which is incorporated herein by reference in its entirety.

FIELD OF THE INVENTION

The invention relates to cosmetic contact lenses, more specifically to ink compositions that can be used to make cosmetic contact lenses, such as cosmetic silicone hydrogel lenses.

BACKGROUND OF THE INVENTION

The use of tinted hydrogel contact lenses to alter the natural color of the eye for cosmetic purposes is known. Ink compositions employed to produce tinted hydrogel contact lenses are typically composed of a binding polymer and colorants. Known ink compositions for cosmetic lenses are generally designed for conventional (non-silicone) lenses.

In recent years, contact lenses formed from silicone hydrogels have become popular. These contact lenses have higher oxygen permeability than traditional hydrogels. The improved oxygen permeability has reduced the symptoms of hypoxia in contact lens users wearing them. Unfortunately, processes used to produce traditional hydrogel lenses do not work well to consistently produce silicone hydrogel contact lenses. An example of one such process is the production of cosmetic silicone hydrogel contact lenses.

Ink compositions that provide cosmetic contact lenses, such as cosmetic silicone hydrogel contact lenses, without significant smearing or rub-off of the ink, and that are compatible with the base lens material, would be an advance in the art.

SUMMARY OF THE INVENTION

The invention provides ink compositions that contain a colorant, a hydrophilic polymer, and a binding polymer that is a triblock species. The ink compositions, when used for example with silicone hydrogel contact lenses, provide contact lenses that are round (not distorted) and where the ink, once applied to the lens, does not smear and easily rub-off. The ink compositions, therefore, are well suited for the manufacture of cosmetic contact lenses.

In one aspect, therefore, the invention provides an ink composition for making cosmetic contact lenses. The ink composition comprises: (a) a colorant; (b) a hydrophilic polymer; and (c) a binder polymer comprising a triblock polymer of formula:

[A]-[B]-[C]

wherein [A] and [C] are independently polymeric segments formed from a first hydrophilic monomer comprising functionality selected from the group consisting of hydroxyalkyl, aminoalkyl, and mixtures thereof and optionally one or more second hydrophilic monomers; and [B] is a polymeric segment formed from a silicone-containing macromer; optionally a third hydrophilic monomer comprising functionality selected from the group consisting of hydroxyalkyl, aminoalkyl, and mixtures thereof; and optionally a silicone-containing monomer.

In another aspect, the invention provides a cosmetic contact lens. The cosmetic contact lens comprises: a contact lens having applied thereon an ink composition as described herein.

In a further aspect, the invention provides a method for making a cosmetic contact lens. The method comprises: (i) applying a clear coat to a lens forming surface of a first lens forming mold; (ii) applying to the clear coat an ink composition as described herein; (iii) optionally repeating step (i), step (ii), or both step (i) and step (ii); (iv) dispensing a lens material to the first lens forming mold; (v) applying a second lens forming mold; and (vi) curing the lens material to form the cosmetic contact lens.

DETAILED DESCRIPTION OF THE INVENTION

It is to be understood that the invention is not limited to the details of construction or process steps set forth in the following description. The invention is capable of other embodiments and of being practiced or being carried out in various ways using the teaching herein.

As noted above, in one aspect, the invention provides ink compositions. The inventors have discovered that ink compositions as described herein can be used to produce cosmetic contact lenses, such as cosmetic silicone hydrogel contact lenses, with favorable properties. For instance, such lenses exhibit low or no haze, which indicates a favorable compatibility between the materials of the ink composition and the materials of the base lens. In addition, the inks exhibit little or no smearing or rub-off of the ink. Further, the ink compositions do not adversely affect the shape of the lenses. The lenses, therefore, generally retain their round shape.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

Lenses of the present invention may be comprised of silicone hydrogels or conventional hydrogels. Silicone hydrogels typically contain at least one hydrophilic monomer and at least one silicone-containing component that are covalently bound to one another in the cured device.

An ink composition according to the invention comprises: (a) a colorant; (b) a hydrophilic polymer; and (c) a binder polymer.

The colorant for use in the ink compositions of the invention may be any organic or inorganic pigment or dye suitable for use in contact lenses, or combinations of such pigments and/or dyes. The opacity may be controlled by varying the concentration of the colorant in the composition, with higher amounts yielding greater opacity. Illustrative colorants include, without limitation, pthalocyanine blue, pthalocyanine green, carbazole violet, vat orange #1, iron oxide black, iron oxide brown, iron oxide yellow, iron oxide red, titanium dioxide, dichlorotriazine, vinyl sulfone-based dyes, and mixtures of two or more thereof. Useful dyes and pigments are commercially available.

The ink composition of the invention includes a hydrophilic polymer. Without wishing to be bound by theory, it is believed that the hydrophilic polymer helps to stabilize the colorant within the ink composition. Exemplary hydrophilic polymers that may be used in the invention include, but are not limited to, dextran, poly(ethylene oxide), polyvinyl alcohol (PVA), poly (N-isopropylacrylamide), poly(vinylpyrrolidone) (PVP), poly(oligoethylene oxide), polyethylene glycol (PEG), poly (N,N-dimethyl ethylamino acrylate, poly(imine), poly(acrylic acid), or mixtures of two or more thereof. Preferably the hydrophilic polymer has a weight average molecular weight from about 30,000 to about 100,000, more preferably from about 40,000 to about 80,000, even more preferably from about 50,000 to about 60,000. A preferred hydrophilic polymer is PVP. PVP polymers suitable for use in the invention are commercially available or can be readily prepared by those skilled in the art. A preferred commercially available PVP is PVP K30, which has a weight average molecular weight of about 55,000.

The binder polymer of the ink composition comprises a triblock polymer of formula:

[A]-[B]-[C]

wherein

[A] and [C] are independently polymeric segments based on a first hydrophilic monomer comprising functionality selected from the group consisting of hydroxyalkyl and aminoalkyl, and mixtures thereof and optionally one or more second hydrophilic monomers; and

[B] is a polymeric segment based on a silicone-containing macromer; optionally a third hydrophilic monomer comprising functionality selected from the group consisting of hydroxyalkyl, aminoalkyl, and mixtures thereof; and optionally a silicone-containing monomer.

The polymeric segments [A] and [C] of the triblock polymer may be formed independently from a first hydrophilic monomer comprising a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

The polymeric segments [A] and [C] of the triblock polymer may be independently formed from a first hydrophilic monomer comprising 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

The polymeric segments [A] and [C] may both be poly (2-hydroxyethyl methacrylate) (PHEMA) and [B] is poly (mono-n-butyl terminated monomethacryloxypropyl terminated polydimethylsiloxane) (Poly[mPDMS]) which is the graft homopolymer of mPDMS.

The polymeric segments [A] and [C] may both be poly (2-hydroxyethyl methacrylate) (PHEMA) and [B] is poly (mono-n-butyl terminated monomethacryloxypropyl terminated polydimethylsiloxane-co-2-hydroxyethyl methacrylate) (Poly[mPDMS-co-HEMA]) which is the graft copolymer of mPDMS and 2-hydroxyethyl methacrylate (HEMA).

The polymeric segments [A] and [C] of the triblock polymer may be formed from a reactive monomer mixture independently comprising the first hydrophilic monomer and a second hydrophilic monomer independently selected from the group consisting of acrylamide, N,N-dimethylacrylamide (DMA), N-vinylpyrrolidone (NVP), N-vinyl acetamide (NVA), N-vinyl N-methyl acetamide (VMA), N-isopropyl acrylamide, polyethylene glycol monoacrylate, polyethylene glycol monomethacrylate, acrylic acid (AA), methacrylic acid (MAA), N-[(ethenyloxy)carbonyl]-β-alanine, 3-acrylamidopropanoic acid (ACA1), 5-acrylamidopropanoic acid (ACA2), 2-(methacryloyloxy)ethyl trimethylammonium chloride (METAC or Q salt), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT); 1-propanaminium, N,N-dimethyl-N-[3-[(1-oxo-2-propen-1-yl)amino]propyl]-3-sulfo-, inner salt (SBT); 3,5-dioxa-8-aza-4-phosphaundec-10-en-1-aminium, 4-hydroxy-N,N,N-trimethyl-9-oxo-, inner salt, 4-oxide (9CI) (PBT), and mixtures thereof.

The polymeric segments [A] and [C] of the triblock polymer independently comprise the second hydrophilic monomer in an amount in the range of about 0 to about 50 mole percent of [A] and [C]; in an amount in the range of about 0 to about 25 mole percent of [A] and [C]; in an amount in the range of about 0 to about 15 mole percent of [A] and [C]; in an amount in the range of about 0 to about 10 mole percent of [A] and [C]; and most preferably without any other hydrophilic monomer.

The polymeric segment [B] of the triblock polymer may be formed from a silicone-containing macromer comprising one monovalent reactive group selected from the group consisting of (meth)acrylate, (meth)acrylamide, styryl, vinyl, N-vinyl lactam, N-vinylamides, O-vinylethers, O-vinylcarbonates, and O-vinylcarbamates, having between about 1 and about 200 divalent disubstituted siloxane repeating units and terminating with a $C_1$ to $C_8$ linear, branched or cyclic alkyl group.

The silicone-containing macromer may comprise a chemical structure shown in Formula I:

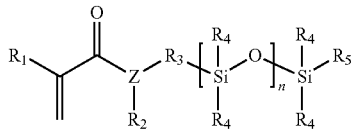

Formula I wherein Z is selected from O, N, S or NCH$_2$CH$_2$O; when Z=O or S, R$_2$ is not required; wherein R$_1$ is a hydrogen atom or methyl; wherein n is a whole number between 1 and 200, or between 1 and 100, or between 1 and 50, or between 1 and 20; wherein R$_3$ is an alkylene segment (CH$_2$)$_y$, in which y is a whole number from 1 to 6, 1 to 4, or 2 to 4, and each methylene group may be optionally further and independently substituted with a group selected from the group consisting of ethers, amines, esters, ketones, carbonyls, carboxylates, and carbamates, or when y is 2 or more a non-terminal methylene group is optionally replaced with a carbamate group; or wherein R$_3$ is an oxyalkylene segment O(CH$_2$)$_z$ in which z is a whole number from 1 to 3, or wherein R$_3$ is a mixture of alkylene and oxyalkylene segments and the sum of y and z is between 1 and 9; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, an alkyl-siloxanyl-alkyl group, a phenyl group, a benzyl group, a substituted or un-substituted aryl group, a fluoroalkyl group, a partially fluorinated alkyl group, a perfluoroalkyl group, a fluorine atom, a mono-, di, or tri-hydroxyalkyl group containing between one and six carbon atoms, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Non-limiting examples of these silicone-containing macromers include mono-n-alkyl terminated mono-methacryloxypropyl terminated polydimethylsiloxanes as shown in Formula II wherein n is between 3 and 50; between 3 and 25; and between 3 and 15 and R$_5$ is a linear, branched, or cyclic alkyl group containing between 1 and 8 carbon atoms; mono-n-butyl terminated mono-methacryloxypropyl terminated polydimethylsiloxanes (mPDMS) as shown in Formula III wherein n is between 3 and 50; between 3 and 25; or between 3 and 15; and macromers having the chemical structures as shown in Formulae IV through XI, wherein R$_1$ is a hydrogen atom or methyl group; R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and R$_5$ is a linear, branched, or cyclic alkyl group containing between 1 and 8 carbon atoms; and wherein n is between 3 and 50; between 3 and 25; or between 3 and 15.

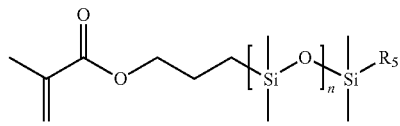

Formula II

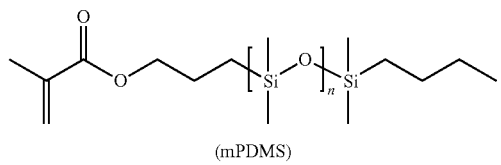

Formula III (mPDMS)

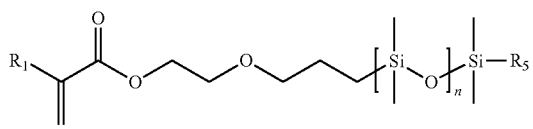

Formula IV

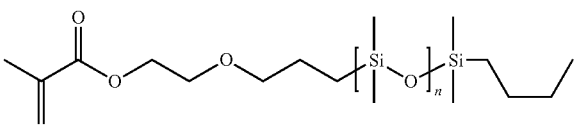

Formula V

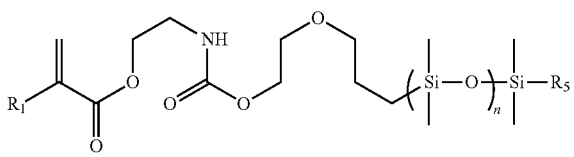

Formula VI

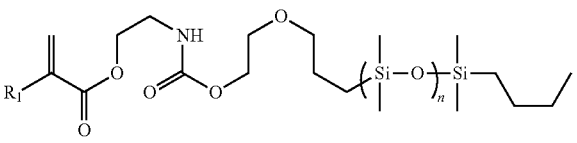

Formula VII

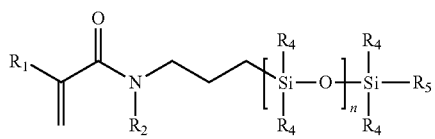

Formula VIII

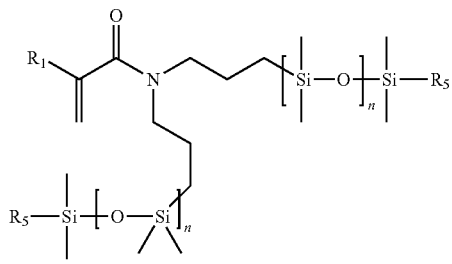

Formula IX

Formula X

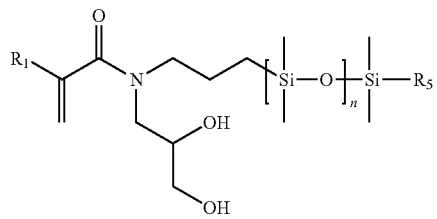

Formula XI

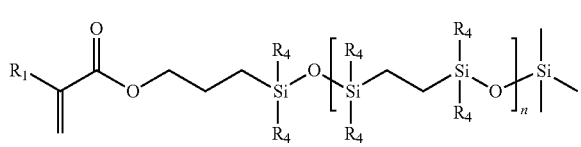

Examples of suitable mono-alkyl terminated mono(meth)acryloxyalkyl terminated polydialkylsiloxanes include mono-n-butyl terminated mono(meth)acryloxypropyl terminated polydimethylsiloxane, mono-n-methyl terminated mono(meth)acryloxypropyl terminated polydimethylsiloxane, mono-n-butyl terminated mono(meth)acryloxypropyl terminated polydiethylsiloxane, mono-n-methyl terminated mono(meth)acryloxypropyl terminated polydiethylsiloxane, mono-alkyl terminated mono(meth)acrylamidoalkyl terminated polydialkylsiloxanes, mono-alkyl terminated mono(meth)acryloxyalkyl terminated polydiarylsiloxanes, and mixtures thereof.

The silicone-containing macromer may comprise a mono-functional hydroxyl-substituted poly(dialkylsiloxane) with a chemical structure shown in Formula XII Formula XII

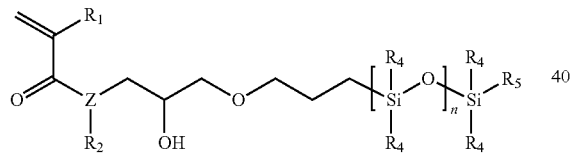

wherein Z is selected from O, N, S or NCH$_2$CH$_2$O; when Z=O or S, R$_2$ is not required; wherein R$_1$ is a hydrogen atom or methyl; wherein n is a whole number between 1 and 200; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Examples of hydroxyl containing macromers include mono-(2-hydroxy-3-methacryloxypropyl)propyl ether terminated mono-n-butyl terminated polydimethylsiloxanes (OH-mPDMS) as shown in Formula XIII wherein n is between 4 and 30; between 4 and 8; or between 10 and 20; and macromers having the chemical structures as shown in Formulae XIV and XV wherein R$_1$ is a hydrogen atom or methyl group; wherein n between 4 and 30; between 4 and 8; or between 10 and 20; wherein R$_4$ is independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Formula XIII (OH-mPDMS)

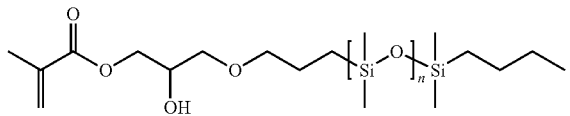

Formula XIV

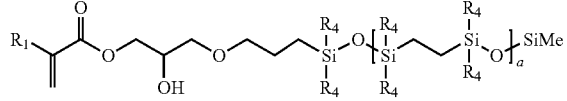

Formula XV

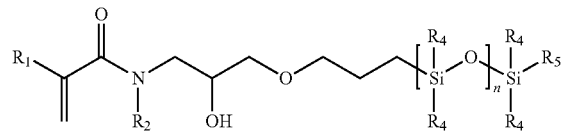

The silicone-containing macromer may comprise the chemical structure shown in Formula XVI.

Formula XVI

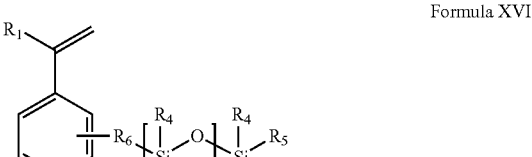

wherein R$_1$ is a hydrogen atom or methyl; wherein n is a whole number between 1 and 200; wherein R$_4$ is independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof wherein R$_5$ is a substituted or un-substituted linear, branched, or cyclic alkyl group having 1 to 8 carbon atoms or an aryl group, any of which may be further substituted with one or more fluorine atoms or trimethylsiloxy groups; and wherein R$_6$ is an alkylene segment (CH$_2$)$_y$, in which y is a whole number from 0 to 6, 0 to 4, and 0 to 2, and each methylene group may be optionally further and independently substituted with a group selected from the group consisting of ethers, amines, alcohols, esters, carbonyls, carboxylates, and carbamates.

The silicone-containing macromer may be a mixture of macromers having the chemical structures shown in Formulae I to XVI.

Preferably, the silicone-containing macromer is selected from the group consisting of monoalkyl terminated, mono (meth)acrylate terminated poly(dialkylsiloxanes), monoalkyl terminated, monoalkyl terminated, mono(meth)acrylate terminated poly(diarylsiloxanes), monoalkyl terminated, mono(meth)acrylate terminated poly(alkylarylsiloxanes), and mixtures thereof.

Most preferably, the silicone-containing macromer is selected from the group consisting of mono-n-butyl terminated monomethacryloxypropyl terminated polydimethylsiloxane (Formula III), mono-n-butyl terminated mono-(2-hydroxy-3-methacryloxypropyl)-propyl ether terminated polydimethylsiloxane (Formula XIII), and mixtures thereof.

The polymeric segment [B] of the triblock polymer may be formed from a silicone-containing macromer and another component selected from the group consisting of a third hydrophilic monomer comprising functionality selected from the group consisting of hydroxyalkyl, aminoalkyl, and mixtures thereof and a silicone-containing monomer.

In particular, the third hydrophilic monomer may be selected from the group consisting of a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

More specifically, the third hydrophilic monomer may be selected from the group consisting of 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth) acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof. Most preferably, the third hydrophilic monomer is 2-hydroxyethyl methacrylate.

The polymeric segment [B] of the triblock polymer comprises the third hydrophilic monomer in an amount in the range of about 0 to about 50 mole percent of [B]; in an amount in the range of about 0 to about 25 mole percent of [B]; in an amount in the range of about 0 to about 15 mole percent of [B]; in an amount in the range of about 0 to about 10 mole percent of [B]; in an amount in the range of about 0 to about 5 mole percent of [B]; and most preferably in an amount in the range of about 1 to about 5 mole percent of [B].

The polymeric segment [B] of the triblock polymer may further comprise a silicone-containing monomer which is selected from the group consisting of 3-methacryloxypropyl tris(trimethylsiloxy)silane, 3-acryloxypropyl tris(trimethylsiloxy)silane, 3-methacrylamidopropyl tris(trimethylsiloxy) silane, 3-acrylamidopropyl tris(trimethylsiloxy)silane, tris(trimethylsiloxy)silyl styrene, 2-methyl-2-hydroxy-3-[3-[1, 3,3,3-tetramethyl-1-[(trimethylsilyl)oxy]disiloxanyl] propoxy]propyl ester, N-(2,3-dihydroxylpropyl) N-(3-tetra (dimethylsiloxy)dimethylbutylsilane)propyl) acrylamide and mixtures thereof.

Preferably, the triblock polymer is comprised of repeating units of the siloxane-containing macromer between about 30 and about 80 weight percent; between about 30 and about 70 weight percent; and between about 40 and about 70 weight percent.

More preferably, the polymeric segment [B] of the triblock polymer comprises a copolymer wherein the copolymer has repeating units of the siloxane-containing macromer comprises between about 75 and about 99 weight percent of [B]; between about 85 and about 99 weight percent of [B]; between about 90 and about 99 weight percent of [B]; between about 50 and about 99 mole percent of [B]; between about 50 and about 75 mole percent of [B]; and between about 60 and about 75 mole percent of [B].

The polymeric segment [B] may further comprise repeating units of a silicone-containing monomer in an amount in the range of about 1 to about 50 mole percent of [B]; in an amount in the range of about 1 to about 25 mole percent of [B]; in an amount in the range of about 1 to about 15 mole percent of [B]; and in an amount in the range of about 1 to about 10 mole percent of [B].

The polymeric segments [A], [B], and [C] of the triblock polymer may be all homopolymers; or, the polymeric segments [A], [B], and [C] of the triblock polymer may be all copolymers; the polymeric segments [A], [B], and [C] of the triblock polymer may be independently selected from the group consisting of homopolymers, copolymers, and terpolymers. Most preferably, the polymeric segments [A] and [C] are homopolymers and the polymeric segment [B] is a copolymer.

In particular, polymeric segments [A] and [C] may both be homopolymers of a hydroxyalkyl (meth)acrylate and polymeric segment [B] is a copolymer comprising repeating units derived from mono-n-butyl terminated monomethacryloxypropyl terminated polydimethylsiloxane (mPDMS) or mono-n-butyl terminated mono-(2-hydroxy-3-methacryloxypropyl)-propyl ether terminated polydimethylsiloxane (OH-mPDMS) and the same hydroxyalkyl (meth)acrylate as used to prepare segments [A] and [C].

Most preferably, polymeric segments [A] and [C] are homopolymers of a 2-hydroxyethyl methacrylate and polymeric segment [B] segment is a copolymer comprising repeating units derived from mono-n-butyl terminated monomethacryloxypropyl terminated polydimethylsiloxane (mPDMS) and 2-hydroxyethyl methacrylate (HEMA).

Polymeric segments [A] and [C] may be homopolymers of a 2-hydroxyethyl methacrylate and polymeric segment [B] segment is a terpolymer comprising repeating units derived from mono-n-butyl terminated monomethacryloxypropyl terminated polydimethylsiloxane, mono-n-butyl terminated mono-(2-hydroxy-3-methacryloxypropyl)-propyl ether terminated polydimethylsiloxane, and 2-hydroxyethyl methacrylate.

The triblock polymer may have a weight average molecular weight in the range of about 10 to about 100 kDa; in the range of about 20 to about 80 kDa in the range of about 20 to about 60 kDa in the range of about 20 to about 50 kDa; and may be used to compatibilize components of a reactive monomer mixture for making ophthalmic devices. Such a compatible reactive monomer mixture upon exposure to polymerization conditions forms a silicone hydrogel that is effective to form an ophthalmic device.

The triblock polymer may be formed via an organotellurium mediated living free radical polymerization (TERP) reaction in the presence of a TERP mediator. Such reactions are known and described, for instance, in Chem. Rev. 2009, 109, 5051-5068. Specific illustrations for the synthesis of the triblock polymer of the invention are described in copending U.S. application Ser. No. 15/691,829, filed Aug. 31, 2017, which is incorporated herein by reference in its entirety.

TERPs are versatile and relatively insensitive to the types of monomer used and functional groups present. Typically, the monomers of interest along with an organotellurium chain transfer agent are mixed with or without a thermal free radical initiator or a photoinitiator under common polymerization conditions to produce a polymer with good molecular weight control (see JACS 2002, 124, 13666-13667 and JACS 2003, 125, 8720-8721). Block copolymers are made by sequential addition of monomer mixtures or by photo-induced radical coupling reactions (see J. Poly. Sci. Pt. A Polym. Chem. 2006, 44, 1-12 and JACS 2012, 134, 5536-5539). Polymers made by TERP have an organotellurium end group that may be reduced, for example, by using 2,2,6,6-tetramethylpiperine 1-oxyl (TEMPO), to create a vinylidene end group. Other reagents may be used to remove the organotellurium end group as described, for example, in Chem. Rev. 2009, 109, 5051-5068. In preferred aspects, the triblock polymer is non-reactive; that is, it does not react with the base lens to form covalent bonds. Thus, if TEMPO is used to remove the organotellurium end group to create a vinylidene end group, it is preferred that the polymer by utilized under conditions where the vinylidene end group does not react with other species, including with the base lens or with other vinylidene end groups in the triblock polymer.

The ink composition preferably further includes a solvent to facilitate mixing of the components and formation of a cosmetic lens. Suitable solvents include, but are not limited to, ethanol, 1-propanol, 2-propanol, 1-ethoxy-2-propanol (1E2P), t-butyl alcohol, t-amyl alcohol, and 3,7-dimethyl-1,7-octanediol (D3O), tripropylene glycol methyl ether (TPME), isopropyl lactate (IPL), 1-(2-hydroxy ethyl)-2-pyrrolidone (HEP), glycerol, or mixtures of two or more thereof. Preferred solvents are 1E2P, IPL, D3O, HEP, 1-propanol, or mixtures thereof.

Preferred ink compositions according to the invention comprise: from 0.1 to about 25 weight percent, preferably from about 5 to about 15 weight percent of a colorant; from about 1 to about 50 weight percent, preferably from about 10 to about 40 weight percent, of a hydrophilic polymer; from about 1 to 60 weight percent, preferably from about 5 to about 40 weight percent, of the tri-block copolymer; and from about 50 to about 95 weight percent, preferably from about 55 to about 80 weight percent, of solvent, each based on the total weight of the ink composition.

The ink composition may be applied to, or printed on, one or more surfaces of a lens or may be printed onto one or more surfaces of a mold into which a lens forming material will be deposited and cured. In a preferred method for forming cosmetic lenses incorporating the ink composition of the invention, a thermoplastic optical mold, made from any suitable material including, without limitation, cyclic polyolefins and polyolefins such as polypropylene or polystyrene resin is used. The ink composition is deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured. The plate is subsequently washed with an aqueous solution and the resulting image is etched into the plate to a suitable depth, for example about 20 microns. An ink composition is then deposited onto the elements to fill the depressions.

The metal plate can also be laser etched using appropriate software and lasers to extract the metal in the area that contains the preferred image, thus creating cavities replicating the image in 15 um to 30 um depth. Additionally, laser etching of the preferred pattern can occur on other substrates such as ceramic.

A silicon pad of a geometry suitable for use in printing on the surface and varying hardness is pressed against the image on the plate to remove the ink composition. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear coat is first applied to the molding surface and dried prior to the addition of the ink composition. Preferably such clear coat forms the entirety of the lens' outermost surface. The clear coat, may for example, be a the same as the ink composition described herein but without the colorant. Other materials may, however, be used for the clear coat. In addition, multiple layers of clear coat and/or ink composition may be applied to the mold before addition of the lens material, in order to form a desired cosmetic pattern.

The ink composition of the invention may be used to provide colored hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof. Materials for making soft contact lenses are well known and commercially available. For instance, the lens material may be any of acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9156,934, 9,170,349, 9,244,196, 9,244,197, 9,260,544, 9,297,928, 9,297,929 as well as WO 03/22321, WO 2008/061992, US 2010/0048847, and U.S. application Ser. No. 15/691,829. In another embodiment, the lens may be made from a conventional hydrogel material, for example etafilcon.

A preferred composition for the lens material comprises: a hydrophilic component selected from N, N-dimethylacrylamide ("DMA"), 2-hydroxyethyl methacrylate ("HEMA"), and mixtures thereof; a silicone-containing component selected from 2-hydroxy-3-[3-methyl-3,3-di(trimethylsiloxy)silylpropoxy]-propyl methacrylate (SiMAA), monomethacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof; a wetting agent (preferably PVP or polyvinylmethyacetamide (PVMA)); and a free radical initiator. For the hydrophilic component, mixtures of DMA and HEMA are preferred. For the silicone containing component, OH-mPDMS or mixtures of SiMAA and mPDMS are preferred. The composition may contain other ingredients known in the art for making soft contact lenses including, but not limited to, diluents, crosslinkers, light absorbing compounds (e.g., UV or high energy visible light blockers), and the like.

The following non-limiting examples further illustrate the invention.

EXAMPLES

Triblock copolymer molecular weights are determined by Size Exclusion Chromatography with Multi-Angle Light Scattering (SEC-MALS). A typical SEC-MALS setup employed a suitable solvent such as 1-propanol (or THF) with (or without) 10 mM LiBr (or another commonly used salt) as the mobile phase at a flow rate of 0.6 mL/min at 65° C. Three Tosoh Biosciences TSK-gel columns in series are used (SuperAW3000 4 um, 6.0 mm ID×15 cm (PEO/DMF Exclusion Limit=60,000 g/mole), SuperAW4000 6 um, 6.0 mm ID×15 cm (PEO/DMF Exclusion Limit=400,000 g/mole) and a SuperAW5000 7 um, 6.0 mm ID×15 cm (PEO/DMF Exclusion Limit=4,000,000 g/mole)) with an online Agilent 1200 UV/VIS diode array detector, a Wyatt Optilab rEX interferometric refractometer, and a Wyatt mini-DAWN Treos multiangle laser scattering (MALS) detector ($\lambda$=658 nm). A d$\eta$/dc value of 0.0.074 mL/g at 30° C. ($\lambda$=658 nm) is used for absolute molecular weight determination. Absolute molecular weights and polydispersity data are calculated using the Wyatt ASTRA 6.1.1.17 SEC/LS software package.

Imaging is used to qualitatively assess the overall quality of a printed pattern in comparison to the desired design (smear or no smear; no smear is listed as "none" in the tables below) as well as the degree of roundness and level of distortion of the lenses (round or out of round (OOR)). Unacceptable levels of haze or translucency are also noted by imaging (hazy or none). Images of the silicone hydrogel printed contact lenses are captured using a Nikon SMZ18 stereo microscope with a P2-DBF Fiber diascopic illumination base (1× objective with 0.75-1× magnification). The printed silicone hydrogel contact lenses are placed concave side up into a crystal cell completely filled with borate buffered packing solution. Samples are placed in the viewing window and the microscope adjusted to focus the image.

The durability of the printed pattern is assessed by rubbing the printed surface with a cotton swab. The test consists of 50 swipes of the lens. Each swipe starts at the lens center on the printed surface and then proceed in a single direction. Each lens is systematically evaluated, swiping in four orthogonal directions. If the pattern stays intact for 50 such swipes, then it is deemed permanent (>50 in the tables). Otherwise, the number of swipes required to dislodge, distort, or remove any portion of the printed pattern is recorded.

Wettability of lenses was determined using a sessile drop technique using KRUSS DSA-100™ instrument at room temperature and using deionized water as probe solution (Sessile Drop). The lenses to be tested were rinsed in deionized water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface. Typically, three to five lenses were evaluated and the average contact angle reported.

The following abbreviations will be used throughout the Examples and have the following meanings:
L: liter
mL: milliliter
equiv. or eq.: equivalent
kg: kilogram
g: gram
mol: mole
mmol: millimole
min: minute(s)
nm: nanometer(s)
Da: dalton or g/mole
kDa: kilodalton or an atomic mass unit equal to 1,000 daltons
wt. %: weight percent
TL03 lights: Phillips TLK 40W/03 bulbs
LED: light emitting diode
BC: back or base curve plastic mold
FC: front curve plastic mold
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
RMM: reactive monomer mixture
DMA: N, N-dimethylacrylamide (Jarchem)
HEMA: 2-hydroxyethyl methacrylate (Bimax)
PVP, PVP K30, PVP K60, PVP K90: poly(N-vinylpyrrolidone) (ISP Ashland)
TEGDMA: tetraethylene glycol dimethacrylate (Esstech)
AIBN: azobisisobutyronitrile Te-Me=ethyl 2-methyl-2-(methyltellanyl)propanoate TEMPO: (2,2,6,6-Tetramethylpiperidin-1-yl)oxyl, or (2,2,6,6-Tetramethylpiperidin-1-yl)oxidanyl CAS #2564-83-2

Irgacure 819: bis(2,4,6-trimethylbenzoyl)-phenylphosphineoxide (BASF or Ciba Specialty Chemicals)

Irgacure 1870: blend of bis(2,6-dimethoxybenzoyl)-2,4,4-trimethyl-pentylphosphineoxide and 1-hydroxy-cyclohexyl-phenyl-ketone (BASF or Ciba Specialty Chemicals)

mPDMS: mono-n-butyl terminated monomethacryloxypropyl terminated polydimethylsiloxane ($M_n$=800-1500 daltons) (Gelest)

HO-mPDMS: mono-n-butyl terminated mono-(2-hydroxy-3-methacryloxypropyl)-propyl ether terminated polydimethylsiloxane ($M_n$=400-1500 daltons) (Ortec or DSM-Polymer Technology Group)

SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate Blue HEMA: 1-amino-4-[3-(4-(2-methacryloyloxy-ethoxy)-6-chlorotriazin-2-ylamino)-4-sulfophenylamino]anthraquinone-2-sulfonic acid, as described in U.S. Pat. No. 5,944,853

DIW: deionized water

IPA: isopropyl alcohol

THF: tetrahydrofuran

D3O: 3,7-dimethyl-3-octanol (Vigon)

TPME: tripropylene glycol methyl ether

DA: decanoic acid

3E3P: 3-ethyl 3-pentanol

Norbloc: 2-(2'-hydroxy-5-methacrylyloxyethylphenyl)-2H-benzotriazole (Janssen)

Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2 liter volumetric flask.

Omnirad are commercial photoinitiators.

Example 1

Synthesis of Ethyl 2-methyl-2-(methyltellanyl)propanoate (Te-Me): 50.0 grams (39.2 mmol) of tellurium powder was reacted with 14.4 mL of a 3.0 M methyl lithium solution (43.1 mmol) in anhydrous THF to form a tellurolate intermediate, which was reacted with 8.82 grams (45.1 mmol) of ethyl α-bromoisobutyrate to form the TERP mediator 2-methyl-2-methyltellanyl-propanoate. The reaction was performed with an ice bath for the metal exchange step. Following the addition of ethyl α-bromoisobutyrate, the reaction mixture was warmed and maintained at room temperature until the reaction was complete (about 2 hours). Thereafter, the THF was removed at reduced pressure in a rotary evaporator. The crude product was vacuum distilled at 50-55° C. (1-2 mbar) to yield the TERP mediator Te-Me and characterized by proton nuclear magnetic resonance spectroscopy. A similar process was used to make ethyl 2-methyl-2-(butyltellanyl)propanoate (Te-Bu) by replacing the methyl lithium with butyl lithium. Te-Bu was purified by vacuum distilled at 80-85° C. (1-2 mbar) and characterized by proton nuclear magnetic resonance spectroscopy.

81.1 grams (623 mmol) HEMA, 5.41 grams (21 mmol) Te-Me, and 3.46 grams (21 mmol) AIBN were added into a 2 L reactor and dissolved in 500 mL of 1-propanol. The solution was degassed by bubbling nitrogen gas through the system for 15 minutes at room temperature. The reaction mixture was then heated at 61-62° C. under a nitrogen gas atmosphere for about 4 hours until all of the reactants were consumed. 18.0 grams (138 mmol) HEMA and 180.2 grams (200 mmol) mPDMS were dissolved in 250 mL of 1-propanol, degassed by bubbling nitrogen gas through the system for 15 minutes at room temperature, charged into the reaction vessel, and heated at 70-72° C. with constant stirring for about 4 hours until all of the reactants were consumed. Finally, 81.1 grams (623 mmol) HEMA were dissolved in 250 mL of 1-propanol, degassed by bubbling nitrogen gas through the system for 15 minutes at room temperature, charged into the reaction vessel, and heated at 61-62° C. with constant stirring for about 8 hours until all of the reactants were consumed. The volatile components of the reaction mixture were removed under reduced pressure in a rotary evaporator. The crude product was re-dissolved in 800 mL of toluene at 60° C. and allowed to cool down. The mixed solvent system was removed by rotary evaporation to yield a crude product free of 1-propanol. The crude product contained a methyl tellurium end group. To remove this organometallic end group, the crude product was dissolved in 800 mL toluene containing about 19.5 grams (125 mmol) of TEMPO. This solution was heated at 88° C. for 5 hours. The reaction mixture was allowed to cool down and then the volatile components were evaporated at 60-65° C. on a rotary evaporator, yielding a dark orange residue. The residue was dissolved in 95% (v/v) aqueous acetonitrile at 70° C. for 30 minutes, forming a cloudy solution. The cloudy solution was cooled to room temperature and allowed to settle for at least 1 hour. The solvent was decanted off. This purification process was repeated three times using acetonitrile. Optionally, the triblock copolymer may be further purified by dissolving in THF (1 g/mL) in the presence of suspended carbon powder and celite for at least 2 hours. The mixture was then vacuum filtered, and the filter cake washed with a small amount of THF. The filtrate was added dropwise into DIW with vigorous stirring to precipitate out the triblock copolymer. The triblock copolymer was isolated by vacuum filtration, washed with DIW, and vacuum dried at 60-65° C. to constant weight. The triblock copolymer was characterized by proton nuclear magnetic resonance spectroscopy and size exclusion chromatography using a multi-angle laser light scattering detector. The number average molecular weight was 39 kDa, and the weight average molecular weight was 47 kDa. This experiment was scaled-up yielding 820 grams of triblock copolymer having a number average molecular weight of 51 kDa and a weight average molecular weight of 58 kDa; this triblock copolymer (TBC #1) was used to prepare inventive ink compositions.

Example 2

Ink compositions #2A-D were prepared by preparing a 9 weight percent black iron oxide pigment, Sicovit® black 85 E 172 (Rockwood Italia SpA-Divisione Silo) formulation from the clear coat solutions listed in Table 1. Inks were mixed overnight using ajar roller. They may also be mixed using an overhead mixer at 700-1800 rpm for 30 minutes.

TABLE 1

| Component | Clear Coat#2A (wt. %) | Clear Coat#2B (wt. %) | Clear Coat#2C (wt. %) | Clear Coat#2D (wt. %) |
|---|---|---|---|---|
| TBC#1 | 11 | 16 | 36 | 10 |
| PVP K30 | 21 | 7 | 0 | 20 |
| 1E2P | 68 | 77 | 64 | 70 |
| Totals | 100 | 100 | 100 | 100 |

Example 3

Front curve molds were printed using a laboratory scale pad printer first with a clear coating (Clear Coats 2A-2D) and then with a Vivid® cliché pattern using Inks 2A-2D. These printed front curve molds were degassed for at least 12 hours under nitrogen. Printed contact lenses were fabricated in a glove box wherein the oxygen gas level was maintained between 0.5 and 5%. About 100 microliters of RMM #1 listed in Table 2 were dosed into the printed front curve molds at ambient temperature. The time between dosing RMM #1 and placing the BC is termed "Dwell 1." The nominal Dwell 1 time was not more than 5 seconds unless noted otherwise. The base curve molds were then placed over the RMM #1. Next, a clear quartz plate was placed on top of the mold assemblies. The pallets containing the mold assemblies were then moved into the curing chamber at 60-70° C. The time between placing the weight and starting cure is termed "Dwell 2." Cure is started via irradiation of the pallets containing the mold assemblies with TL 20W/03 T fluorescent bulbs (Philips) and positioned to achieve an intensity of 1.5-2.0 mW/cm$^2$ for 10 minutes.

The printed lenses were manually de-molded with most lenses adhering to the FC and released by submerging the lenses in 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The lenses were transferred into vials and subsequently sterilized by autoclaving at 122° C. for 30 minutes. The sterile printed lenses (3A-3C, made from ink compositions 2A-2C respectively) were evaluated for haze, smear, durability, and shape, and the results listed in Table 3 for various Dwell 2 times with a fixed Dwell 1 time of less than 4 seconds. The sterile printed lenses (3D, made from ink composition 2D) were evaluated for haze, smear, durability, and shape, and the results listed in Table 4 for various Dwell 2 times with a fixed Dwell 1 time of less than 4 seconds and in Table 5 for various Dwell 1 times with a fixed Dwell 2 time of 300 seconds. Similar results were obtained using RMM #2 to make the printed lenses using a Dwell 2 time of 300 seconds at 60-70° C.

TABLE 2

| Component | RMM#1 Weight Percent | RMM#2 Weight Percent | RMM#3 Weight Percent |
|---|---|---|---|
| mPDMS 1000 | 31 | 0 | 28 |
| SIMAA | 28 | 0 | 31 |
| OH-mPDMS ($M_n$ = 1000 g/mol) | 0 | 55 | 0 |
| DMA | 24 | 19.5 | 22.6 |
| HEMA | 6 | 8 | 6 |
| PVP K90 | 7 | 12 | 9 |
| TEGDMA | 1.5 | 3 | 1.25 |
| Norbloc | 2 | 2.2 | 1.8 |
| Blue HEMA | 0.02 | 0.02 | 0.02 |
| OmniRad 1870 | 0.34 | 0 | 0.33 |
| OmniRad 184 | 0.14 | 0 | 0 |
| IRGACURE 819 | 0 | 0.25 | 0 |
| Σ Reactive Components | 100 | 100 | 100 |

Final reactive monomer mixtures RMM#1, RMM#2, and RMM#3 were prepared by combining the component mixtures listed above in Table 2 with D3O diluent to make a solution comprised of 77 weight percent reactive components and 23 weight percent D3O diluent.

TABLE 3

| | Printed Lens #3A | | Printed Lens #3B | | Printed Lens #3C | |
|---|---|---|---|---|---|---|
| | Dwell 2 (min) | | | | | |
| | 1 | 10 | 1 | 10 | 1 | 10 |
| Haze | None | None | None | None | None | None |
| Smear | None | None | None | None | Smear | Smear |
| Durability (swipes) | >50 | >50 | 3-5 | ND | 1-2 | 8-16 |
| Shape | OOR | Round | Round | Round | OOR | Round |

ND: not determined

TABLE 4

| Dwell 2 (seconds) | Haze | Smear | Durability (swipes) | Shape |
|---|---|---|---|---|
| 180 | None | None | >50 | Round |
| 300 | None | None | >50 | Round |
| 420 | None | None | >50 | Round |
| 540 | None | None | >50 | Round |
| 1800 | None | None | >50 | Round |

TABLE 5

| Dwell 1 (seconds) | Dwell 2 (seconds) | Haze | Smear | Durability (swipes) | Shape |
|---|---|---|---|---|---|
| 30-45 | 300 | None | None | >50 | Round |
| 60 | 300 | None | None | >50 | Round |
| 120 | 300 | None | None | >50 | Round |
| 180 | 300 | None | None | >50 | Round |
| 300 | 300 | None | None | >50 | Round |

Example 4

Ink compositions #4A-4D were prepared by preparing a 9 weight percent black iron oxide pigment, Sicovit® black 85 E 172 (Rockwood Italia SpA-Divisione Silo) formulation from the clear coat solutions listed in Table 6. Inks were mixed overnight using ajar roller. They may also be mixed using an overhead mixer at 700-1800 rpm for 30 minutes.

TABLE 6

| Component | Clear Coat#4A (wt. %) | Clear Coat#4B (wt. %) | Clear Coat#4C (wt. %) | Clear Coat#4D (wt. %) |
|---|---|---|---|---|
| TBC#1 | 8.2 | 6.2 | 2.9 | 3.0 |
| PVP K30 | 16.8 | 12.6 | 23.7 | 20.7 |
| PVP K60 | 0 | 6.2 | 7.9 | 6.7 |
| D3O | 7.9 | 8.2 | 0 | 20.0 |
| 1E2P | 67.1 | 66.8 | 59.6 | 49.6 |
| HEP | 0 | 0 | 5.9 | 0 |
| Totals | 100 | 100 | 100 | 100 |

Example 5

Front curve molds made of 90:10 (w/w) Z:TT were printed using a laboratory scale pad printer first with a clear coating (Clear Coats 4A-4D) and then with a Vivid® cliché pattern using Inks 4A-4D. These printed front curve molds were degassed for at least 12 hours under nitrogen. Printed contact lenses were fabricated in a glove box wherein the oxygen gas level was about 0.1%. About 75 microliters of RMM #3 listed in Table 2 were dosed into the printed front curve molds at ambient temperature. The time between dosing RMM and placing the BC is termed "Dwell 1." The nominal Dwell 1 time was not more than 5 seconds unless noted otherwise. The base curve molds made of 90:10 (w/w) Z:TT were then placed over the RMM #3. Next, a clear quartz plate was placed on top of the mold assemblies. The pallets containing the mold assemblies were then moved into the curing chamber at about 65° C. The time between placing the weight and starting cure is termed "Dwell 2." Dwell 2 was 5 minutes. Cure is started via irradiation of the pallets containing the mold assemblies with TL 20W/03 T fluorescent bulbs (Philips) and positioned to achieve an intensity of about 4.5 mW/cm$^2$ for 8 minutes.

The printed lenses were manually de-molded with most lenses adhering to the FC and released by submerging the lenses in 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. Printed lenses (5A-5D, made from clear coats and inks 4A-4D, respectively) were evaluated for haze, smear, durability, shape, and wettability (sessile drop, contact angle, front curve surface), and the results listed in Table 7 (standard deviation shown in parentheses).

TABLE 7

| | Printed Lens #5A | Printed Lens #5B | Printed Lens #5C | Printed Lens #5D |
|---|---|---|---|---|
| Haze | None | None | None | None |
| Smear | None | None | Smear | None |
| Durability (swipes) | >50 | >50 | >50 | >50 |
| Shape | Round | Round | Round | Round |
| Sessile Drop (°) | 111 (3.4) | 104 (3.3) | 70 (9) | 75 (10) |

Example 6

Ink compositions #6A-6B were prepared by preparing a 9 weight percent black iron oxide pigment, Sicovit® black 85 E 172 (Rockwood Italia SpA-Divisione Silo) formulation from the clear coat solutions listed in Table 8. Inks were mixed overnight using ajar roller. They may also be mixed using an overhead mixer at 700-1800 rpm for 30 minutes.

TABLE 8

| Component | Clear Coat#6A (wt. %) | Clear Coat#6B (wt. %) |
|---|---|---|
| TBC#1 | 6 | 5.5 |
| PVP K30 | 13.5 | 12 |
| PVP K60 | 7.5 | 7 |
| IPL | 45 | 0 |
| D3O | 0 | 15 |
| 1E2P | 18.5 | 51 |
| HEP | 9.5 | 9.5 |
| Totals | 100 | 100 |

Example 7

Example 5 was reproduced on a pilot line used to make pad printed contact lenses but using clear coats and inks 6A and 6B. The printed lenses were de-molded with most lenses adhering to the FC and released by submerging the lenses in 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the packaging solution swollen hydrogels. The printed lenses were transferred into vials and subsequently sterilized by autoclaving at 122° C. for 30 minutes. Printed lenses (7A and 7B, made from clear coats and inks 6A and 6B, respectively) were evaluated for haze, smear, durability, shape, and wettability (sessile drop, contact angle, front curve surface), and the results listed in Table 9 (standard deviation shown in parentheses).

TABLE 9

| | Printed Lens #7A | Printed Lens #7B |
|---|---|---|
| Haze | None | None |
| Smear | None | None |
| Durability (swipes) | >50 | >50 |
| Shape | Round | Round |
| Sessile Drop (°) | 50 (11) | 63 (12) |

We claim:

1. A cosmetic contact lens comprising: a contact lens having applied thereon an ink composition, the ink composition comprising: (a) a colorant; (b) a hydrophilic polymer; and (c) a binder polymer comprising a triblock polymer of formula:

[A]-[B]-[C]

wherein [A] and [C] are independently polymeric segments formed from a first hydrophilic monomer comprising functionality selected from the group consisting of hydroxyalkyl, aminoalkyl, and mixtures thereof and optionally one or more second hydrophilic monomers; and

[B] is a polymeric segment formed from a silicone-containing macromer; optionally a third hydrophilic monomer comprising functionality selected from the group consisting of hydroxyalkyl, aminoalkyl, and mixtures thereof; and optionally a silicone-containing monomer.

2. The cosmetic contact lens of claim 1 wherein the ink composition further comprises (d) a solvent.

3. The cosmetic contact lens of claim 2 wherein the solvent comprises: ethanol, 1-propanol, 2-propanol, 1-ethoxy-2-propanol (1E2P), t-butyl alcohol, t-amyl alcohol, and 3,7-dimethyl-1,7-octanediol (D3O), tripropylene glycol methyl ether (TPME), isopropyl lactate (IPL), 1-(2-hydroxy ethyl)-2-pyrrolidone (HEP), glycerol or mixtures of two or more thereof.

4. The cosmetic contact lens of claim 2 wherein the hydrophilic polymer comprises: dextran, poly(ethylene oxide), polyvinyl alcohol (PVA), poly (N-isopropylacrylamide), poly(vinylpyrrolidone), poly(oligoethylene oxide), polyethylene glycol (PEG), poly (n,n-dimethyl ethylamino acrylate, poly(imine), poly(acrylic acid), or mixtures of two or more thereof.

5. The cosmetic contact lens of claim 1 wherein the colorant comprises: pthalocyanine blue, pthalocyanine green, carbazole violet, vat orange #1, iron oxide black, iron oxide brown, iron oxide yellow, iron oxide red, titanium dioxide, dichlorotriazine, vinyl sulfone-based dyes, and mixtures of two or more thereof.

6. The cosmetic contact lens of claim 2 wherein the ink composition comprises: from 0.1 to about 25 weight percent of the colorant; from about 1 to about 50 weight percent of the hydrophilic polymer; from about 1 to 60 weight percent of the tri-block copolymer; and from about 50 to about 95 weight percent of the solvent, each based on the total weight of the ink composition.

7. The cosmetic contact lens of claim 1 wherein the triblock polymer has a weight average molecular in the range of about 10 to about 100 kDa.

8. The cosmetic contact lens of claim 7 wherein the triblock polymer has a weight average molecular in the range of about 20 to about 80 kDa.

9. The cosmetic contact lens of claim 8 wherein the triblock polymer has a weight average molecular in the range of about 20 to about 60 kDa.

10. The cosmetic contact lens of claim 9 wherein the triblock polymer has a weight average molecular in the range of about 20 to about 50 kDa.

11. The cosmetic contact lens of claim 1, wherein the segments [A] and [C] both comprise the first hydrophilic monomer comprising functionality selected from the group consisting of hydroxyalkyl, aminoalkyl, and mixtures thereof and optionally one or more second hydrophilic monomers.

12. The cosmetic contact lens of claim 1, wherein the first hydrophilic monomer is the same as the third hydrophilic monomer.

13. The cosmetic contact lens of claim 1 wherein the hydrophilic polymer is poly(vinylpyrrolidone).

14. The cosmetic contact lens of claim 1, wherein the first hydrophilic monomer comprises a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

15. The cosmetic contact lens of claim 14, wherein the first hydrophilic monomer comprises 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

16. The cosmetic contact lens of claim 11, wherein the first hydrophilic monomer of both segments [A] and [C] is 2-hydroxyethyl (meth)acrylate.

17. The cosmetic contact lens of claim 1, wherein [A] and [C] independently further comprise the second hydrophilic monomer that comprises acrylamide, N,N-dimethylacrylamide, N-vinylpyrrolidone, N-vinyl acetamide, N-vinyl N-methyl acetamide, N-isopropyl acrylamide, polyethylene glycol monoacrylate, polyethylene glycol monomethacrylate, acrylic acid, methacrylic acid, N-[(ethenyloxy)carbonyl]-β-alanine, 3-acrylamidopropanoic acid, 5-acrylamidopropanoic acid, 2-(methacryloyloxy)ethyl trimethylammonium chloride, 2-acrylamido-2-methylpropane sulfonic acid, 1-propanaminium, N-(2-carboxyethyl)-N,N-dimethyl-3-[(1-oxo-2-propen-1-yl)amino]-, inner salt; carboxybetaine, 1-propanaminium, N,N-dimethyl-N-[3-[(1-oxo-2-propen-1-yl)amino]propyl]-3-sulfo-, inner salt; 3,5-dioxa-8-aza-4-phosphaundec-10-en-1-aminium, 4-hydroxy-N,N,N-trimethyl-9-oxo-, inner salt, 4-oxide (9Cl), or mixtures thereof.

18. The cosmetic contact lens of claim 17, wherein the repeating units of the second hydrophilic monomer are present independently in segments [A] and [C] in the range of about 1 to about 50 mole percent.

19. The cosmetic contact lens of claim 18, wherein the repeating units of the second hydrophilic monomer are present independently in segments [A] and [C] in the range of about 1 to about 25 mole percent.

20. The cosmetic contact lens of claim 19, wherein the repeating units of the second hydrophilic monomer are present independently in segments [A] and [C] in the range of about 1 to about 15 mole percent.

21. The cosmetic contact lens of claim 20, wherein the repeating units of the second hydrophilic monomer are present independently in segments [A] and [C] in the range of about 1 to about 10 mole percent.

22. The cosmetic contact lens of claim 1, wherein [B] further comprises the third hydrophilic monomer that comprises a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

23. The cosmetic contact lens of claim 22, wherein the third hydrophilic monomer comprises 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

24. The cosmetic contact lens of claim 23, wherein the first hydrophilic monomer and the third hydrophilic monomer both comprise 2-hydroxyethyl (meth)acrylate.

25. The cosmetic contact lens of claim 22, wherein the repeating units of the third hydrophilic monomer are present in segment [B] in the range of about 1 to about 70 mole percent.

26. The cosmetic contact lens of claim 25, wherein the repeating units of the third hydrophilic monomer are present in segment [B] in the range of about 10 to about 60 mole percent.

27. The cosmetic contact lens of claim 26, wherein the repeating units of the third hydrophilic monomer are present in segment [B] in the range of about 20 to about 60 mole percent.

28. The cosmetic contact lens of claim 27, wherein the repeating units of the third hydrophilic monomer are present in segment [B] in the range of about 30 to about 50 mole percent.

29. The cosmetic contact lens of claim 1, wherein the silicone-containing macromer comprises a polymerizable functional group selected from the group consisting of (meth)acrylate, (meth)acrylamide, styryl, vinyl, N-vinyl lactam, N-vinylamides, O-vinylethers, O-vinylcarbonates, and O-vinylcarbomates.

30. The cosmetic contact lens of claim 1, wherein the silicone-containing macromer comprises a chemical structure shown in Formula I:

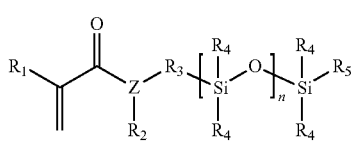

Formula I wherein Z is selected from O, N, S or $NCH_2CH_2O$; when Z=O or S, $R_2$ is not required; wherein $R_1$ is a hydrogen atom or methyl; wherein n is a whole number between 1 and 200; wherein $R_3$ is an alkylene segment $(CH_2)_y$ in which y is a whole number from 1 to 6, and each methylene group may be optionally further and independently substituted with a group selected from the group consisting of ethers, amines, esters, ketones, carbonyls, carboxylates, and carbamates, or when y is 2 or more a non-terminal methylene group is optionally replaced with a carbamate group; or wherein $R_3$ is an oxyalkylene segment $O(CH_2)_z$ in which z is a whole number from 1 to 3, or wherein $R_3$ is a mixture of alkylene and oxyalkylene segments and the sum of y and z is between 1 and 9; wherein $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, an alkyl-siloxanyl-alkyl group, a phenyl group, a benzyl group, a substituted or un-substituted aryl group, a fluoroalkyl group, a partially fluorinated alkyl group, a perfluoroalkyl group, a fluorine atom, a mono-, di, or tri-hydroxyalkyl group containing between one and six carbon atoms, or combinations thereof; and wherein $R_5$ is a substituted or un-substituted linear, branched, or cyclic alkyl group having 1 to 8 carbon atoms or an aryl group, any of which may be further substituted with one or more fluorine atoms or trimethylsiloxy groups.

31. The cosmetic contact lens of claim 30, wherein the silicone-containing macromer is selected from the group consisting of monoalkyl terminated, mono(meth)acrylate terminated poly(dialkylsiloxanes), monoalkyl terminated, monoalkyl terminated, mono(meth)acrylate terminated poly(diarylsiloxanes), monoalkyl terminated, mono(meth)acrylate terminated poly(alkylarylsiloxanes), and mixtures thereof.

32. The cosmetic contact lens of claim 31, wherein the silicone-containing macromer is mono-n-butyl terminated monomethacryloxypropyl terminated polydimethylsiloxane.

33. The cosmetic contact lens of claim 1, wherein the silicone-containing macromer comprises a chemical structure shown in Formula VIII:

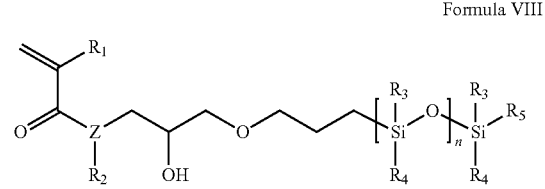

Formula VIII wherein Z is selected from O, N, S or $NCH_2CH_2O$; wherein $R_1$ is independently hydrogen atom or methyl group; wherein $R_2$, $R_3$, and $R_4$ are independently a hydrogen atom or a linear, branched, or cyclic alkyl group containing one to eight carbon atoms, any of which may be further substituted with at least one hydroxy group, and which may be optionally substituted with amido, ether, amino, carboxyl, carbonyl groups and combinations thereof; for Z=O and S, $R_2$ is not required; wherein n is the number of siloxane repeating units and is from 4 to 200; and wherein $R_5$ is selected from straight or branched $C_1$ to $C_8$ alkyl groups.

34. The cosmetic contact lens of claim 33, wherein the silicone-containing macromer is mono-n-butyl terminated mono-(2-hydroxy-3-methacryloxypropyl)-propyl ether terminated polydimethylsiloxane.

35. The cosmetic contact lens of claim 1, wherein the silicone-containing macromer is selected from the group consisting of mono-n-butyl terminated monomethacryloxypropyl terminated polydimethylsiloxane, mono-n-butyl terminated mono-(2-hydroxy-3-methacryloxypropyl)-propyl ether terminated polydimethylsiloxane, and mixtures thereof.

36. The cosmetic contact lens of claim 1, wherein the silicone-containing macromer has a number average molecular weight greater than 500 Daltons.

37. The cosmetic contact lens of claim 36, wherein the silicone-containing macromer has a number average molecular weight between about 500 Daltons and about 20,000 Daltons.

38. The cosmetic contact lens of claim 37, wherein the silicone-containing macromer has a number average molecular weight between about 500 Daltons and about 10,000 Daltons.

39. The cosmetic contact lens of claim 38, wherein the silicone-containing macromer has a number average molecular weight between about 500 Daltons and about 5,000 Daltons.

40. The cosmetic contact lens of claim 39, wherein the silicone-containing macromer has a number average molecular weight between about 500 Daltons and about 2,000 Daltons.

41. The cosmetic contact lens of claim 1, wherein the repeating units of the silicone-containing macromer are present in the range of about 30 and about 80 weight percent of the triblock polymer.

42. The cosmetic contact lens of claim 41, wherein the repeating units of the silicone-containing macromer are present in the range of about 30 and about 70 weight percent of the triblock polymer.

43. The cosmetic contact lens of claim 42, wherein the repeating units of the silicone-containing macromer are present in the range of about 40 and about 70 weight percent of the triblock polymer.

44. The cosmetic contact lens of claim 1, wherein segment [B] is a copolymer of the silicone-containing macromer and the third hydrophilic monomer, and the repeating units of the silicone-containing macromer are present in the range of about 75 and about 99 weight percent of the total weight of segment [B].

45. The cosmetic contact lens of claim 44, wherein the repeating units of the silicone-containing macromer are present in the range of about 85 and about 99 weight percent of the total weight of segment [B].

46. The cosmetic contact lens of claim 45, wherein the repeating units of the silicone-containing macromer are present in the range of about 90 and about 99 weight percent of the total weight of segment [B].

47. The cosmetic contact lens of claim 1, wherein segment [B] is a copolymer of the silicone-containing macromer and the third hydrophilic monomer, and the repeating units of the silicone-containing macromer are present in the range of about 30 and about 99 mole percent of segment [B].

48. The cosmetic contact lens of claim 47, wherein the repeating units of the silicone-containing macromer are present in the range of about 40 and about 75 mole percent of segment [B].

49. The cosmetic contact lens of claim 48, wherein the repeating units of the silicone-containing macromer are present in the range of about 55 and about 75 mole percent of segment [B].

50. The cosmetic contact lens of claim 1, wherein the silicone-containing monomer is selected from the group consisting of: 3-methacryloxypropyl tris(trimethylsiloxy)silane, 3-acryloxypropyl tris(trimethylsiloxy)silane, 3-methacrylamidopropyl tris(trimethylsiloxy)silane, 3-acrylamidopropyl tris(trimethylsiloxy)silane, tris(trimethylsiloxy) silyl styrene, 2-methyl-2-hydroxy-3-[3-[1,3,3,3-tetramethyl-1-[(trimethylsilyl)oxy]disiloxanyl]propoxy]propyl ester, N-(2,3-dihydroxylpropyl) N-(3-tetra(dimethylsiloxy)dimethylbutylsilane)propyl) acrylamide and mixtures thereof.

51. The cosmetic contact lens of claim 50, wherein the repeating units of the silicone-containing monomer are present in segment [B] in the range of about 1 to about 50 mole percent.

52. The cosmetic contact lens of claim 51, wherein the repeating units of the silicone-containing monomer are present in segment [B] in the range of about 1 to about 25 mole percent.

53. The cosmetic contact lens of claim 52, wherein the repeating units of the silicone-containing monomer are present in segment [B] in the range of about 1 to about 15 mole percent.

54. The cosmetic contact lens of claim 53, wherein the repeating units of the silicone-containing monomer are present in segment [B] in the range of about 1 to about 10 mole percent.

55. The cosmetic contact lens of claim 1, wherein the segments [A], [B], and [C] are all homopolymers.

56. The cosmetic contact lens of claim 55, wherein segments [A] and [C] are the same homopolymer.

57. The cosmetic contact lens of claim 1, wherein the segments [A], [B], and [C] are all copolymers.

58. The cosmetic contact lens of claim 1, wherein the segments [A], [B], and [C] are independently selected from the group consisting of homopolymers, copolymers, and terpolymers.

59. The cosmetic contact lens of claim 1, wherein the segments [A] and [C] are homopolymers and segment [B] is a copolymer.

60. The cosmetic contact lens of claim 59, wherein the segments [A] and [C] are the same homopolymer.

61. The cosmetic contact lens of claim 1, wherein the segments [A] and [C] are homopolymers of a hydroxyalkyl (meth)acrylate and segment [B] is selected from the group consisting of a homopolymer of mono-alkyl terminated monomethacryloxypropyl terminated polydimethylsiloxane, a homopolymer of mono-alkyl terminated mono-(2-hydroxy-3-methacryloxypropyl)-propyl ether terminated polydimethylsiloxane, a copolymer comprising repeating units derived from a mono-alkyl terminated monomethacryloxypropyl terminated polydimethylsiloxane and a hydroxyalkyl (meth)acrylate, and a copolymer comprising repeating units derived from a mono-alkyl terminated mono-(2-hydroxy-3-methacryloxypropyl)-propyl ether terminated polydimethylsiloxane and a hydroxyalkyl (meth)acrylate.

62. The cosmetic contact lens of claim 61, wherein segments [A] and [C] are homopolymers of a 2-hydroxyethyl (meth)acrylate and the [B] segment is a copolymer comprising repeating units derived from mono-n-butyl terminated monomethacryloxypropyl terminated polydimethylsiloxane and the 2-hydroxyethyl (meth)acrylate.

63. The cosmetic contact lens of claim 61, wherein segments [A] and [C] are homopolymers of a 2-hydroxyethyl (meth)acrylate and the [B] segment is a copolymer comprising repeating units derived from mono-n-butyl terminated mono-(2-hydroxy-3-methacryloxypropyl)-propyl ether terminated polydimethylsiloxane and the 2-hydroxyethyl (meth)acrylate.

64. The cosmetic contact lens of claim 1, further comprising an internal wetting agent.

65. A method for making the cosmetic contact lens of claim 1, the method comprising: (i) applying a clear coat to a lens forming surface of a first lens forming mold; (ii) applying to the clear coat the ink composition; (iii) optionally repeating step (i), step (ii), or both step (i) and step (ii); (iv) dispensing a lens material to the first lens forming mold; (v) applying a second lens forming mold; and (vi) curing the lens material to form the cosmetic contact lens.

66. The cosmetic contact lens of claim claim 1 that is a cosmetic silicone hydrogel contact lens.

\* \* \* \* \*